K. H. V. VON PORAT.
FEEDING DEVICE FOR PULVERULENT FUEL IN FURNACES.
APPLICATION FILED MAY 1, 1918.
1,364,532.
Patented Jan. 4, 1921.
5 SHEETS—SHEET 1.
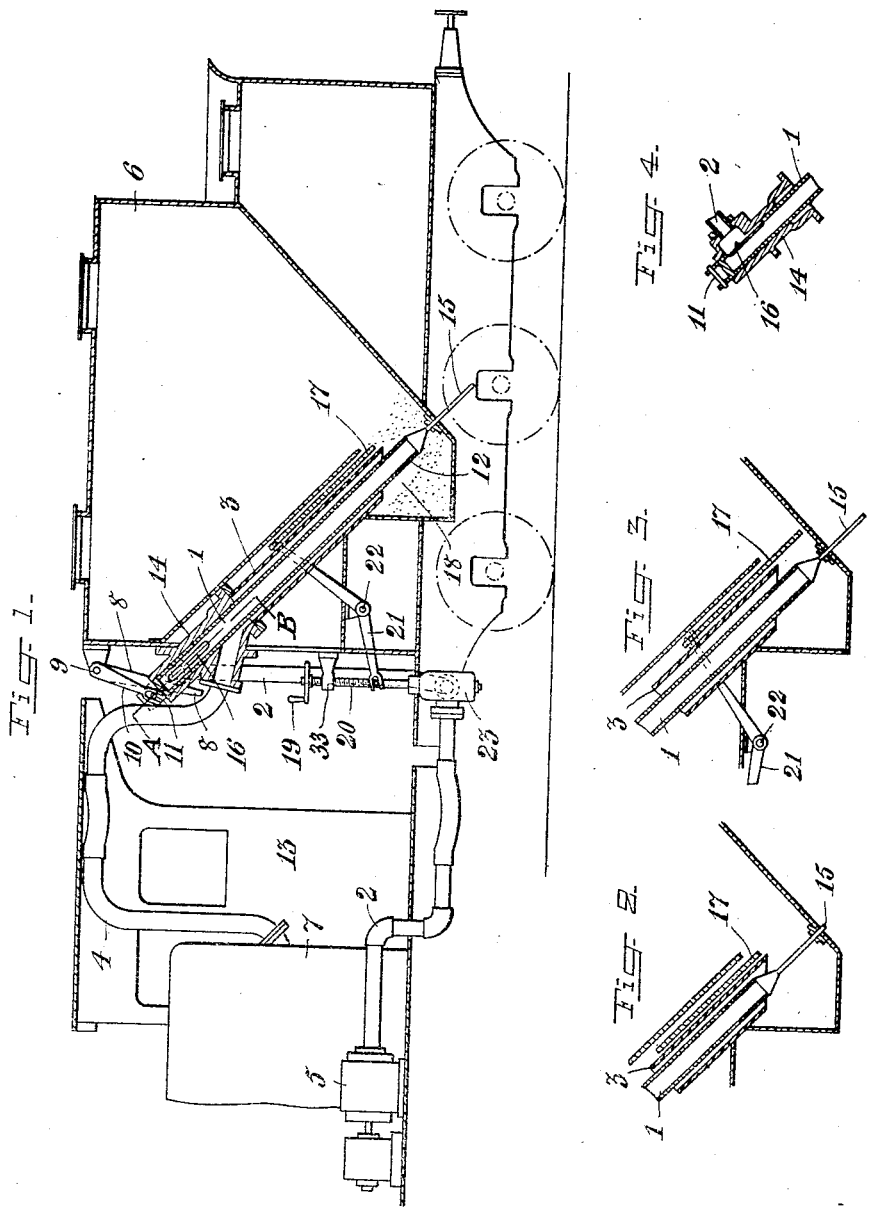
Inventor:
Karl Hjalmar Vilhelm von Porat
by Brown & Seward
Attorneys

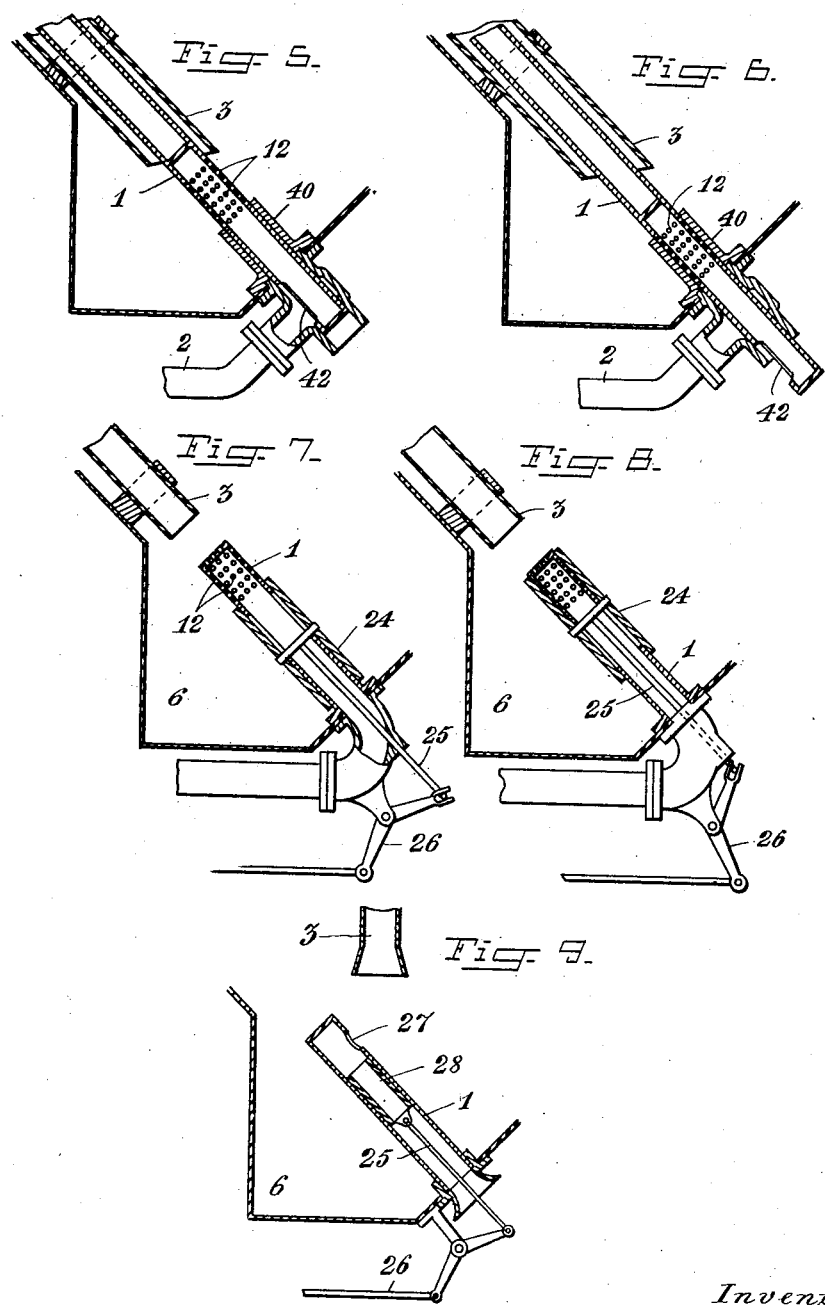

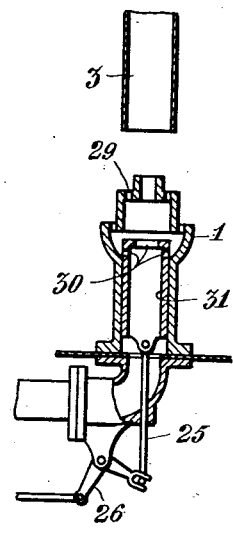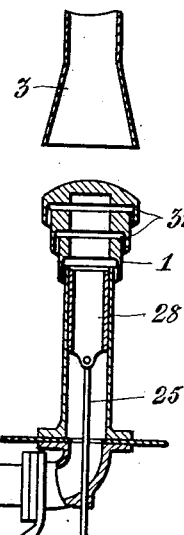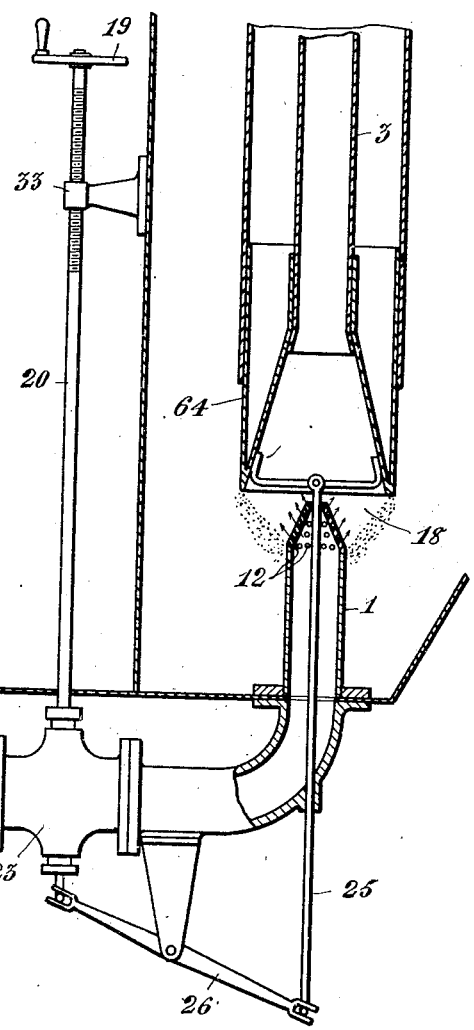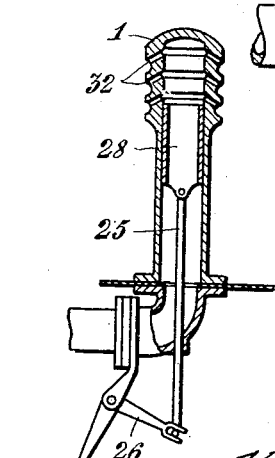

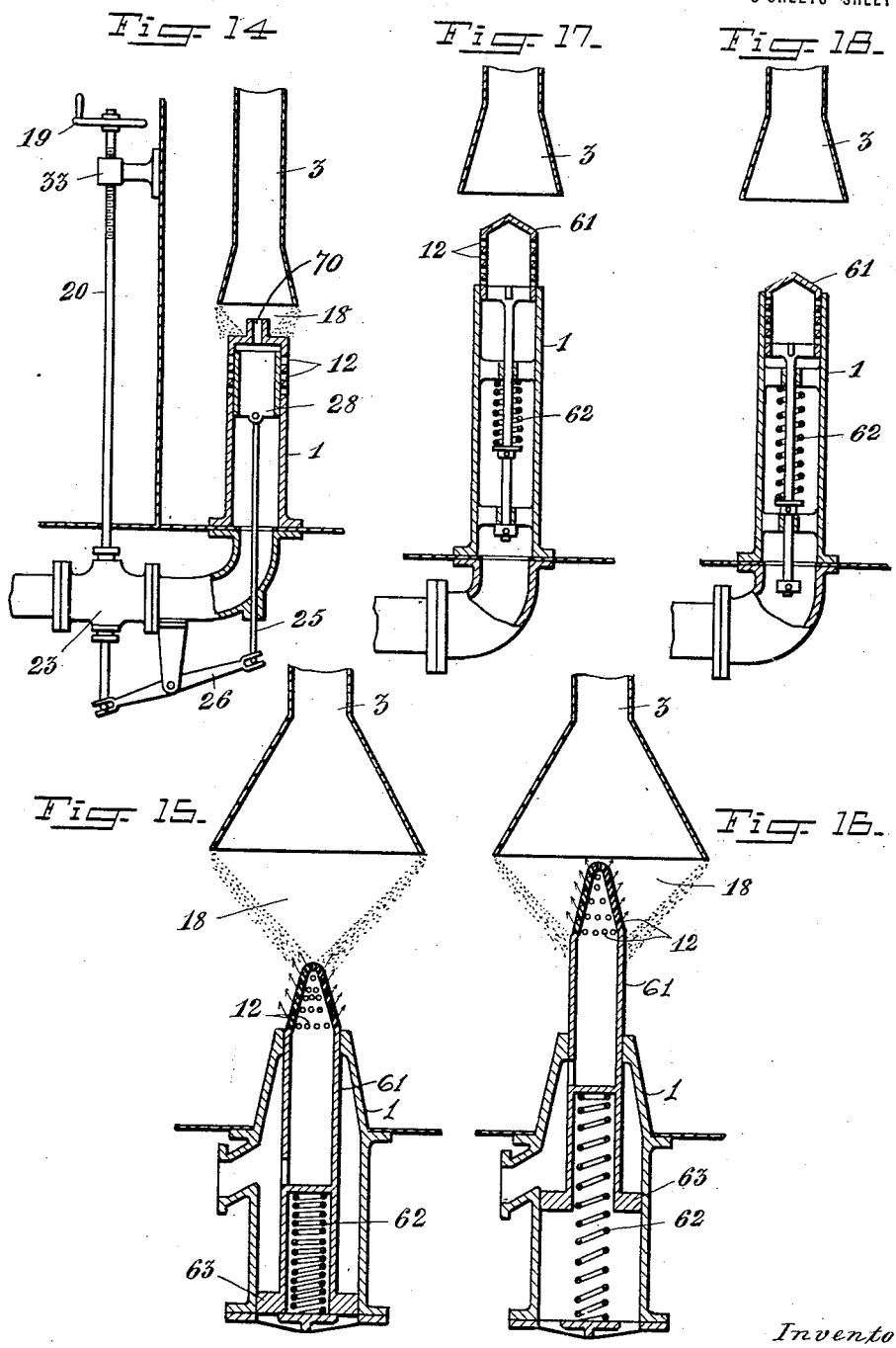

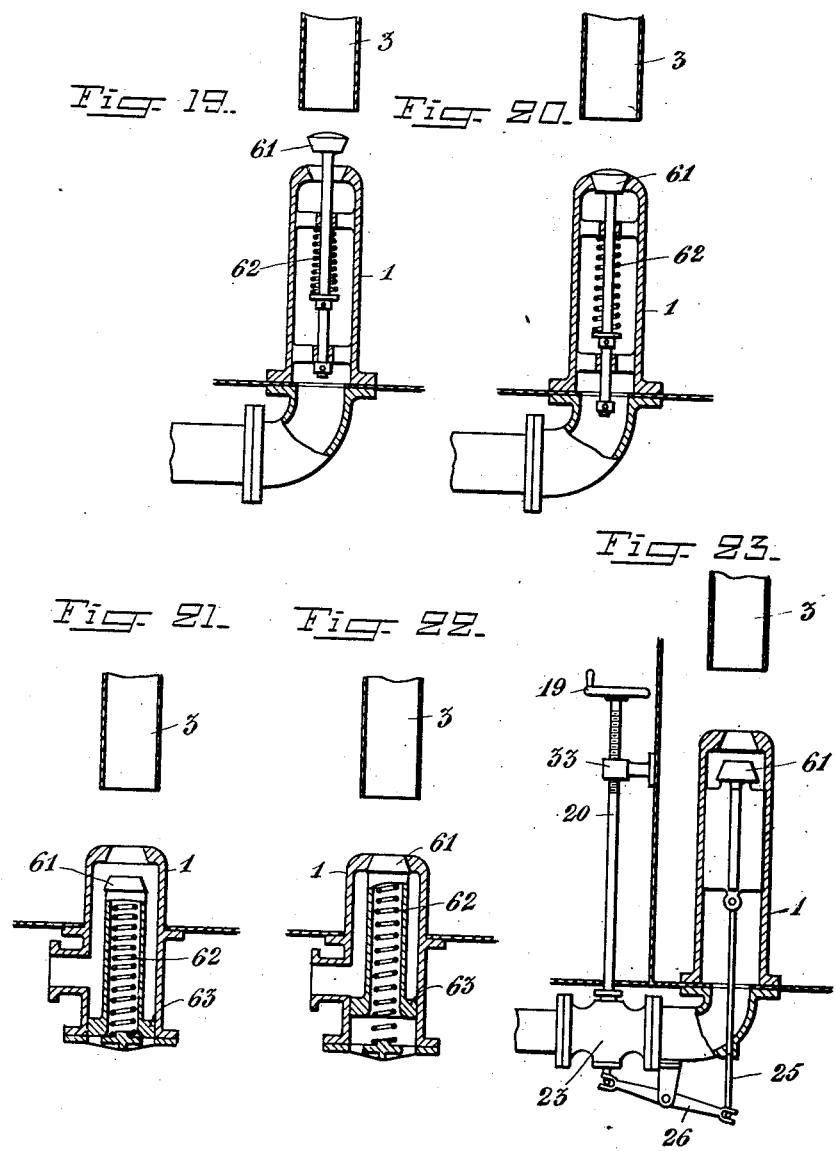

UNITED STATES PATENT OFFICE.

KARL HJALMAR VILHELM von PORAT, OF STOCKHOLM, SWEDEN, ASSIGNOR TO MOTALA VERKSTADS NYA AKTIEBOLAG, OF MOTALA, SWEDEN.

FEEDING DEVICE FOR PULVERULENT FUEL IN FURNACES.

1,364,532.  Specification of Letters Patent.  Patented Jan. 4, 1921.

Application filed May 1, 1918. Serial No. 231,952.

*To all whom it may concern:*

Be it known that I, KARL HJALMAR VILHELM VON PORAT, subject of the King of Sweden, residing at Västra Trädgårdsgatan 4, Stockholm, Sweden, have invented certain new and useful Improvements in Feeding Devices for Pulverulent Fuel in Furnaces, of which the following is a specification.

The present invention relates to such feeding devices for pulverulent fuel in furnaces for locomotives and other engines, where the fuel powder is fed to the mixing and combustion chamber from a powder receptacle by means of a gaseous medium, which is pressed or sucked through the powder pipe, extending between the said receptacle and the furnace.

The invention consists in certain improvements in the devices for starting, regulating and interrupting the feed of fuel from the receptacle to the furnace.

Fourteen embodiments of the invention are illustrated in the accompanying drawings.

Figure 1 shows the first embodiment of the invention applied to a locomotive. Figs. 2 and 3 show details of this embodiment in other positions. Fig. 4 is a section on the line A—B in Fig. 1.

Figs. 5 and 6 are sectional views of the second embodiment in the positions for full feed and interrupted feed respectively.

Figs. 7 and 8 are similar views of the third embodiment. Fig. 9 shows the fourth embodiment in the position for full feed. Figs. 10, 11 and 12 are similar views of the fifth, sixth and seventh embodiment. Figs. 13 and 14 show two embodiments of the kind, where the member for covering and uncovering the air outlet openings is operated from the same handle as the starting air valve. Figs. 15-16, 17-18, 19-20, 21-22 show four embodiments of the kind where the air outlet covering and uncovering member is operated by the air pressure.

Fig. 23 is an embodiment of the same kind as that shown in Figs. 13 and 14.

In Fig. 1 the locomotive tender, the powder receptacle mounted thereon and the conduits for fuel and air are shown entirely, and the rear part of the locomotive is indicated.

Referring to Figs 1–4, 1 indicates the discharge end of the air supply pipe or conduit 2 which extends from a compressor 5 into the interior of the receptacle 6. 3 indicates the receiving end of the fuel pipe or conduit 4, which extends from the interior of the receptacle to the furnace 7. The discharge end 1 of the air supply pipe, that is, substantially that part thereof which is located in the receptacle, is surrounded by the corresponding part 3 of the fuel pipe, and said discharge end 1 is made of a separate tube which is movable with respect to the other part of the conduit 2. The tube 1 is adjustable axially (endwise) in the receiving end 3 of the fuel pipe by means of the handle 8, which projects from the same pivot 9 as the arm 10, the free end of this latter being fork-shaped and engaging a stud 11 on the outer end of the tube 1. The lower end of the tube 1 is provided with a plurality of small holes 12, distributed on all sides of the tube. In some cases it is preferable that only the lower side of the tube 1 be provided with such holes.

In the position shown in Fig. 1, the holes are completely uncovered by the fuel pipe end 3, so that air flows out from all the holes, penetrates and whirls up the adjacent quantity of the powder mass, which is thereby caused to escape together with the air into the fuel tube and hence into the furnace. In Fig. 1 the tube 1 is adjusted into the position for the highest feeding effect. By adjusting the air supply pipe 1 axially by means of the handle 8, which is accessible from the driver's cabin 13, the hole series 12 can be covered partially or completely as shown in Fig. 2, whereby the feeding effect will be reduced and interrupted.

The upper end of tube 1 is guided in the piece 14, which forms a part of the fuel pipe and is mounted in the front wall of the receptacle, and the lower part of tube 1 is guided in the opposite wall of the receptacle by means of the rod 15.

The tube 1 is, at its upper end, provided with a lateral opening or slot 16, through which it communicates with the other part 2 of the air conduit. When the tube is adjusted to its uppermost position, that is to say, into the position for interrupted feeding, the wall of tube 1 closes the communication between 1 and 2, as will be clearly understood from Fig. 2, so that the supply of air to the tube 1 is interrupted.

The feeding of the powder from the receptacle to the furnace can also be regulated by means of a separate member 17, which is mounted in the receptacle independently of both the air supply pipe and the fuel pipe.

Below the receiving opening of the fuel pipe there is formed a free space 18, that is, a space which is free from powder. This space can be increased by moving the member 17, which is guided on the upper side of the tube 3, downward from the position shown in Fig. 1. The space will become of the greatest size when the member has been moved to the position shown in Fig. 3. In this position all the outlet holes 12 of the tube 1 lie within the free space 18, that is, all the holes 12 have been uncovered by the pulverulent fuel in the receptacle. In this position the feeding is interrupted, as the air jets do not penetrate and whirl up the powder but flow alone into the fuel pipe. It will thus be understood that, by adjusting the member 17, the air outlet holes 12 can be uncovered or covered entirely or to any desired degree and the feed thereby be regulated as desired.

The member 17 is operated by means of the hand wheel 19, which is attached to the upper end of the screw 20, mounted in the screw nut 33, which is attached to the receptacle. The movement of the screw 20 is transformed to the member 17 by means of the lever 21, which at 22 is pivotally secured to the receptacle.

In certain cases it is suitable to regulate or control the feed of fuel by increasing or reducing more or less the supply of air to the discharge end 1 of the air pipe, or by increasing or reducing the pressure of the air. This control or regulation is preferably effected by means of the air starting valve 23 which is inserted in the air conduit 2. In embodiments of this kind, where the air outlet holes, such as the holes 12 on the upper side of tube 1, are faced upward, it is necessary that these openings are covered when no air is flowing through same, as otherwise the powder falls down into and may stop up the holes.

To effect this result the member 17 and the valve 23 are operated from the same handle 19, the lower end of the screw 20 being connected with the valve. Thus when the member 17 is moved to its lowest position, where the holes 12 are completely uncovered by the pulverulent powder, the valve 23 is simultaneously closed, and when the member is moved from its lower position, the valve is opened. Preferably the arrangement is such that, when the feeding is started, that is, when the air is supplied by opening the valve 23, all the holes 12 are covered by the pulverulent fuel as a result of the first moment of the movement of the valve body. A regulation of the feed then can be effected either by opening the valve more or less, or by adjusting the tube 1, or by both these operations.

According to the embodiment shown in Figs. 5 and 6, a part of the air supply pipe is surrounded by the fuel pipe, but when the tube 1 is adjusted axially the holes are covered and uncovered by a sleeve or casing 40, which is attached to the receptacle and surrounds and guides the lower end of tube 1. Said casing forms the connection between the tube 1 and the main part 2 of the air supply pipe. In the closed position which is shown in Fig. 6, the communication opening 42 between 1 and 2 is located outside of the casing 40 and receptacle 6, so so that the powder which may have entered into pipe 1, can escape.

According to Figs. 7 and 8 no part of the tube 1 is surrounded by the tube 3, and both pipes are rigidly attached to the receptacle. The tube 1 is surrounded by a sleeve 24, which covers or uncovers the holes 12 when adjusted axially endwise by means of the rod and lever mechanism 25, 26.

According to Fig. 9, the tubes 1 and 2 are arranged at an angle to each other, and the delivering opening 27 of tube 1 is covered and uncovered by the movable sleeve piston 28, which is inserted in the tube 1 and is connected with the rod and lever mechanism 25, 26. The air is here supplied through tube 1 only by the suction arising from the draft in the furnace.

The embodiments of Figs. 10 and 11 are of the same type as that of Fig. 9, the difference consisting substantially in the arrangement of the air delivering openings. In Fig. 9 there is only one lateral opening of relatively great extension in the longitudinal direction of tube 1, which opening is faced upward. In Fig. 10 there is a plurality of openings 29 and 30 in the movable sleeve piston 31 and in the tube 1. All the openings in the tube 1 are faced upward, that is, toward the receiving opening of tube 2.

In Fig. 11 the outlet holes or channels 32 in the tube 1 open downwardly, and in Fig. 12 the channels 32 have an inclined position so that the air flows out obliquely downward.

According to Fig. 13, which shows an embodiment of the kind where the regulation of the feed is effected by covering and uncovering the air outlet holes to the desired degree with respect to the powder mass, both tubes 1 and 2 are fixed, and the said covering and uncovering of the holes 12 is effected by means of a separate sleeve-shaped member 64, which is movable endwise and guided on the tube 3, so that by lowering and raising same the free space 18 below the receiving opening of fuel tube 3 is formed at a higher or lower level in the receptacle, whereby the series of air outlet holes 12 is covered and uncovered more or less by the powder.

The member 64 may be operated from the same handle 19 as the starting air valve 23, in the manner described above with reference to the member 17 in Fig. 1.

In the embodiment shown in Fig. 14 the air outlet holes 12 of tube 1 are covered and uncovered by a sleeve piston 28 guided withwithin the tube 1 as in Figs. 9-12. This piston sleeve is operated simultaneously with the starting of the air valve 23 by a mechanism 19, 20, 25, 26 of the same kind as described above with reference to Figs. 1 and 13.

The central and uppermost air outlet opening 70 of the tube is always uncovered by the powder and has only for its object to blow the powder through the fuel pipe 3, which is necessary for a slight feed, as in such case only a very small quantity of air flows out through the lateral holes 12.

According to the embodiments shown in Figs. 15-22 the discharge end of the air supply pipe and the regulating member inserted therein are operated automatically by the air current according as the pressure of this current is increased or reduced.

The different embodiments are shown in two extreme positions, that is to say at full and interrupted feed.

Referring to Figs. 15-16 the member 61, which is guided in the tube 1, is actuated by a spring 62 which tends to hold it in the upper end position (Fig. 16), in which the feed is interrupted.

When the starting air valve is opened, the air pressure acts on the piston 63 of the member 61 in a direction opposite to the spring pressure, so that the member 61 is moved more or less toward the other (lower) end position according to the quantity of the air supply. When the valve has been opened to a certain degree the member 61 assumes the position for full feed, shown in Fig. 15.

According to the embodiment shown in Figs. 17, 18 the air pressure acts to force the perforated member 61 toward the upper position (full feed) shown in Fig. 17, where the holes 12 are uncovered by the tube 1, while the spring 62 tends to hold the member 61 in the lower position (interrupted feed) shown in Fig. 18, where the holes 12 are entirely covered by the tube 1. The embodiment shown in Figs. 19 and 20 differs from the embodiment shown in Figs. 17 and 18 only that in the former embodiment the member 61 is in the form of a usual valve body which acts to open and close a single opening at the top of tube 1.

According to Figs. 21 and 22 the action of the air pressure and spring is the same as in the embodiment of Figs. 15 and 16, while the movable member 61 is substantially of the kind shown in Figs. 19 and 20.

The spring 62 is preferably so weak that, immediately upon opening the starting air valve 23, that is, even when said valve has only been opened slightly, the member 61, under the influence of the air pressure, is moved to the end position for full feed. The regulation then can be effected by operating the starting air valve 23.

According to the embodiment shown in Fig. 23 an operating mechanism of the kind shown in Fig. 14 is connected with an air outlet covering member 61 of the kind shown in Figs. 19, 22.

Having thus described my invention what I claim as new and desire to secure by Letters Patent is:

1. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to whirl up and bring along with it a quantity of fuel from the receptacle, means for preventing the fuel from falling by gravity into the receiving opening of the fuel pipe, said receiving opening being located some distance above the bottom of the receptacle, a member which is mounted in the receptacle independent of both of said pipes, said member and the discharge end of the air supply pipe being movable in relation to each other in such a way that, by adjusting one of them, the outlet of the air supply pipe can be covered or uncovered to any desired degree by the pulverulent fuel in the receptacle.

2. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to whirl up and bring along with it a quantity of fuel from the receptacle, means for preventing the fuel from falling by gravity into the receiving opening of the fuel pipe, said receiving opening being located some distance above the bottom of the receptacle, the discharge end of the air supply pipe being mounted within the receiving end of the fuel pipe so as to project with its discharge opening below the receiving opening of the fuel pipe, and the adjacent ends of both said pipes being so located that they will be embedded in the mass in the receptacle.

3. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to whirl up and bring along with it a quantity of fuel from the receptacle, means for preventing the fuel from falling by gravity into the receiving opening of the fuel pipe, said receiving opening being located some distance above the bottom of the receptacle, a member mounted in the receptacle independently of both said pipes, said member and the discharge end of the air supply pipe being movable in relation to each other in such a way that, by adjusting one of them, the outlet of the air supply pipe can be wholly uncovered by the pulverulent fuel in the receptacle, and the adjacent ends of both said pipes being so located that they will be embedded in the mass in the reception, 4. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to whirl up and bring along with it a quantity of fuel from the receptacle, means for preventing the fuel from falling by gravity into the receiving opening of the fuel pipe, said receiving opening being located some distance above the bottom of the receptacle, the discharge end of the air supply pipe being mounted within the receiving end of the fuel pipe so as to project with its discharge opening below the receiving opening of the fuel pipe, the adjacent ends of both said pipes being so located that they will be embedded in the mass in the receptacle, and means for preventing the air current or currents from said air supply pipe from flowing in a straight line into the fuel pipe.

5. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to whirl up and bring along with it a quantity of fuel from the receptacle, means for preventing the fuel from falling by gravity into the receiving opening of the fuel pipe, said receiving opening being located some distance above the bottom of the receptacle, a member mounted in the receptacle independently of both said pipes, said member and the discharge end of the air supply pipe being movable in relation to each other in such a way that, by adjusting one of them, the outlet of the air supply pipe can be wholly uncovered by the pulverulent fuel in the receptacle, the adjacent ends of both said pipes being so located that they will be embedded in the mass in the receptacle, and means for preventing the air current or currents from said air supply pipe from flowing in a straight line into the fuel pipe.

6. In a feeding device for pulverulent fuel for furnaces the combination of a powder receptacle, a fuel pipe extending from said receptacle to the furnace, a pipe for supplying air or other gaseous medium into the mass in said receptacle, means for causing an air current or currents from said gas supply pipe to whirl up (penetrate) and bring along with it a quantity of fuel from the receptacle, a starting valve in the air supply pipe for opening and closing said pipe, a member, which is mounted in the receptacle independent of said air supply pipe, said member and the discharge end of the air supply pipe being movable in relation to each other in such a way that by adjusting one of them the outlet of the air supply pipe can be covered or uncovered to any desired degree by (with respect to) the pulverulent fuel in the receptacle and means for operating said valve and said adjustable member simultaneously.

7. In a feeding device for pulverulent fuel for furnaces the combination of a powder receptacle, a fuel pipe extending from said receptacle to the furnace, a pipe for supplying air or other gaseous medium into the mass in said receptacle, means for causing an air current or currents from said gas supply pipe to whirl up (penetrate) and bring along with it a quantity of fuel from the receptacle, a member, which is mounted in the receptacle independent of both of said pipes, said member and the discharge end of the air supply pipe being movable in relation to each other in such a way, that by adjusting one of them the outlet of the air supply pipe can be wholly uncovered by the pulverulent fuel in the receptacle, and means for interrupting the supply of air to the said air outlet automatically when the said adjustment is effected, and means for preventing the fuel transporting currents from the air outlet of the air supply pipe to flow in a straight line into the receiving opening of the fuel pipe.

8. In a feeding device for pulverulent fuel for furnaces the combination of a powder receptacle, a fuel pipe extending from said receptacle to the furnace, a pipe for supplying air or other gaseous medium into the mass in said receptacle, means for causing an air current or currents from said gas supply pipe to whirl up (penetrate) and bring along with it a quantity of fuel from the receptacle, a starting valve in the air supply pipe for opening and closing said pipe, a member, which is mounted in the receptacle, independent of said air supply pipe, said member and the discharge end of the air supply pipe being movable in relation to each other in such a way that by adjusting one of them the outlet of the air supply pipe can be covered or uncovered to any desired degree by (with respect to) the pulverulent fuel in the receptacle and means for operating said valve and said adjustable member simultaneously, and means for preventing the fuel transporting currents from the air outlet of the air supply pipe to flow in a straight line, into the receiving opening of the fuel pipe.

9. In a feeding device for pulverulent fuel for furnaces the combination of a powder receptacle, a fuel pipe extending from said receptacle to the furnace, a pipe for supplying air or other gaseous medium into the mass in said receptacle, means for causing an air current or currents from said gas supply pipe to whirl up (penetrate) and bring along with it a quantity of fuel from the receptacle, a valve in the air supply pipe for opening and closing said pipe, and means for closing said valve and simultaneously uncovering the outlet of the air supply pipe with respect to the powder in the receptacle, and means for preventing the fuel transporting currents from the air outlet of the air supply pipe to flow in a straight line into the receiving opening of the fuel pipe.

10. In a feeding device for pulverulent fuel for furnaces the combination of a powder receptacle, a fuel pipe extending from said receptacle to the furnace, a pipe for supplying air or other gaseous medium into the mass in said receptacle, means for causing an air current or currents from said gas supply pipe to whirl up (penetrate) and bring along with it a quantity of fuel from the receptacle, the outlet for the said fuel air current being arranged in such a way that said current is prevented from flowing in a straight line into the fuel pipe, means for uncovering the air outlet of said air supply pipe by (with respect to) the pulverulent fuel in the receptacle and means for interrupting the supply of air to the said air outlet automatically, when the said uncovering of the air outlet is effected, the discharge end of the air supply pipe being mounted so as to extend within the receiving end of the fuel pipe.

11. In a feeding device for pulverulent fuel for furnaces the combination of a powder receptacle, a fuel pipe extending from said receptacle to the furnace, a pipe for supplying air or other gaseous medium into the mass in said receptacle, means for causing an air current or currents from said gas supply pipe to whirl up (penetrate) and bring along with it a quantity of fuel from the receptacle, a starting valve in the air supply pipe for opening and closing said pipe, a member, which is mounted in the receptacle independent of said air supply pipe, said member and the discharge end of the air supply pipe being movable in relation to each other in such a way that by adjusting one of them the outlet of the air supply pipe can be covered or uncovered to any desired degree by (with respect to) the pulverulent fuel in the receptacle and means for operating said valve and said adjustable member simultaneously, the discharge end of the air supply pipe being mounted so as to extend within the receiving end of the fuel pipe.

12. In a feeding device for pulverulent fuel for furnaces the combination of a powder receptacle, a fuel pipe extending from said receptacle to the furnace, a pipe for supplying air or other gaseous medium into the mass in said receptacle, means for causing an air current or currents from said gas supply pipe to whirl up (penetrate) and bring along with it a quantity of fuel from the receptacle, the discharge end of the air supply pipe being mounted within the receiving end of the fuel pipe so as to project with its discharge opening below the receiving opening of the fuel pipe, said discharge end being mounted in two opposite walls of the receptacle.

In testimony whereof I affix my signature in presence of two witnesses.

KARL HJALMAR VILHELM von PORAT.

Witnesses:
JACOB BAGGE,
GUSTAF ALSON.